M. H. BRABANDT.
PLOW.
APPLICATION FILED JAN. 25, 1919.
1,303,813.
Patented May 13, 1919.
2 SHEETS—SHEET 1.
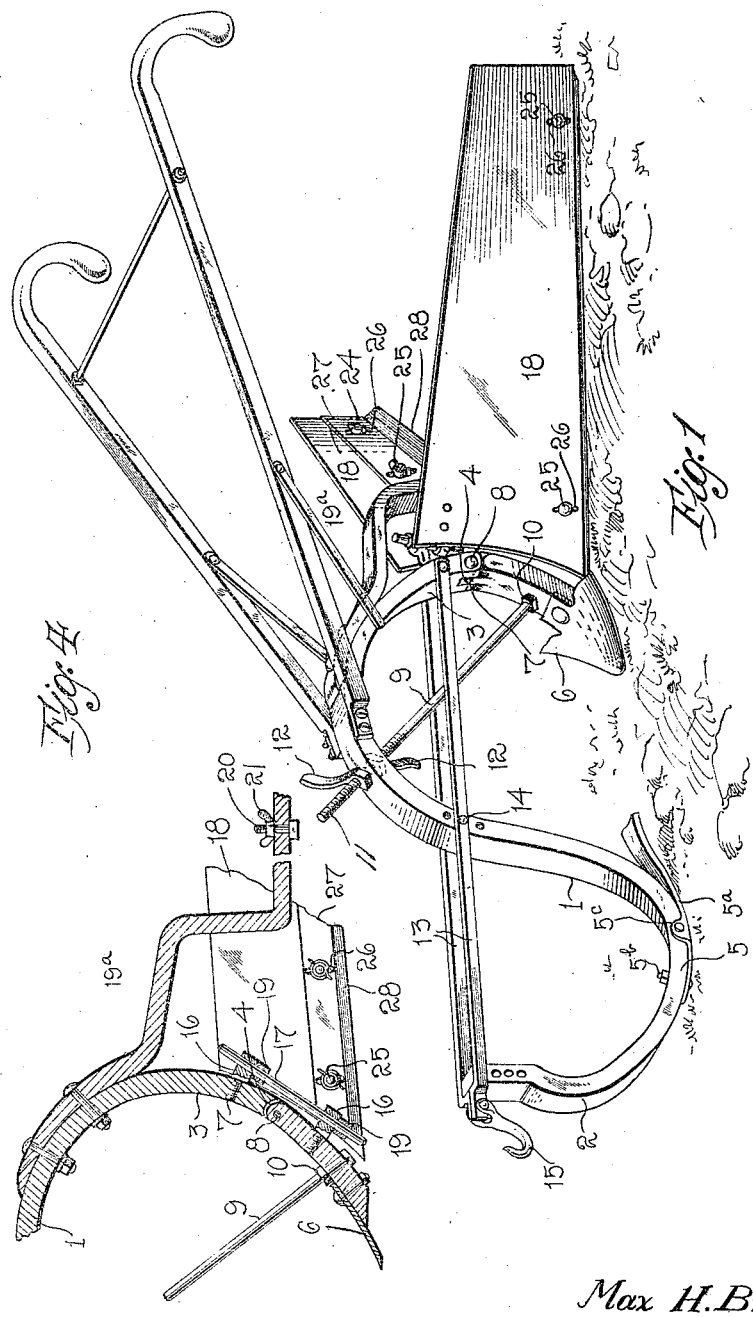
Inventor
Max H. Brabandt.
By
Attorney

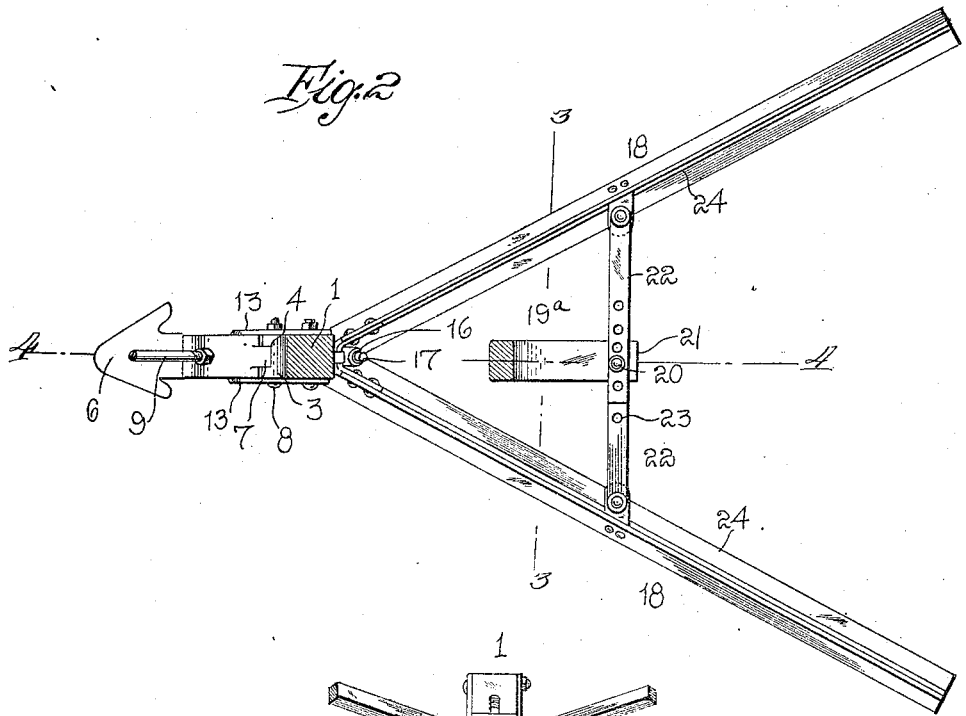
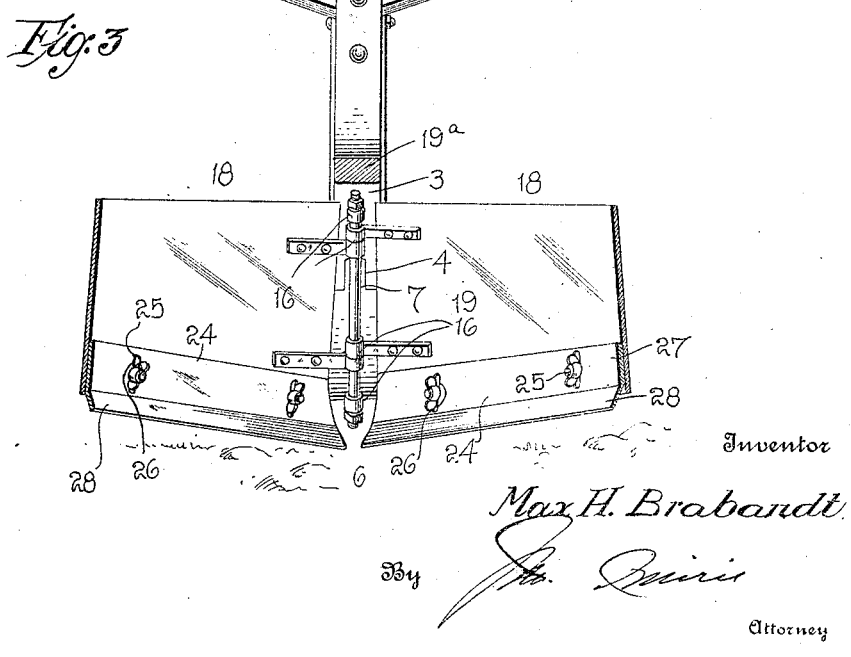

UNITED STATES PATENT OFFICE.

MAX H. BRABANDT, OF PARIS, TEXAS.

PLOW.

1,303,813.   Specification of Letters Patent.   Patented May 13, 1919.

Application filed January 25, 1919. Serial No. 273,110.

*To all whom it may concern:*

Be it known that I, MAX H. BRABANDT, a subject of the Emperor of Germany, (but who has taken out his first papers for citizenship in the United States,) residing at Paris, in the county of Lamar and State of Texas, have invented certain new and useful Improvements in Plows, of which the following is a specification.

My invention relates to improvements in a combined plow and cultivator.

The primary object of the invention is to provide a combined winged plow and cultivator with a specially constructed beam to insure stability, and hold the plow and the wings in proper contact with the earth.

A further object of the invention is to provide an implement of the class described, with means for adjusting the plow point from the beam, and means for adjusting the wings and supporting same on the beam.

The invention also comprehends improvements in the details of construction and arrangement of parts which will be hereinafter described and particularly pointed out in the claims.

In the drawings:

Figure 1 is a perspective view of my improved plow.

Fig. 2 is a plan view of the rear portion of the same, the bottom being shown in section.

Fig. 3 is a section on the line 3—3 of Fig. 2.

Fig. 4 is a section on the line 4—4 of Fig. 2.

1 indicates a plow beam, substantially S shape in side view, the forward end 2, extending upwardly, and its rear end 3, extending downwardly, and is bifurcated, as shown at 4. The forward curved portion 5, of the beam is intended to ride over the surface of the ground, and serves as a means for supporting the implement in proper position when in operation.

Secured to the bottom of the curved portion 5, is a ground slide $5^a$, secured at its forward end by a bolt $5^b$, and at its sides it is provided with ears $5^c$, which embrace the sides of the beams. The rear end of the slide curves upwardly, as shown. This slide acts as a runner when the plow is drawn over the ground.

At the rear end of the beam is a plow point 6, provided with an ear 7, which fits the bifurcated portion 4, and is pivoted on a pin 8. Extending through the point 6, is a rod 9, held in position by nuts 10, and its forward end passes through the upper portion of the beam, and is threaded at 11. Engaging the threaded portion 11, on opposite sides of the beam, are adjusting nuts 12, to set the adjustment of the plow point. Braces 13 are attached to opposite sides of the rear end of the beam, and extend forwardly and are secured at the front to the upturned end 3, of the beam, said braces being also secured intermediate their ends to the beam, as indicated at 14. The front ends of the braces are bent to form ears to receive a shackle 15, as shown.

Extending through to the rear of the plow point, and through to the rear of the downturned end of the beam, are eyes 16, through which extends a pin 17. Extending outwardly and rearwardly from the pin 17, are two wings 18. On the inner forward ends of the wings are hinge members 19, through which the pin passes, and by means of which the wings are pivotally mounted to swing.

Attached to the rear top part of the beam is an extension $19^a$ having its extremity horizontally disposed, and provided with a screw 20, having an engaging nut 21.

Pivoted to the inside of each wing is a bar 22, the inner ends of which are provided with openings 23, to engage the screw 20, and by means of which the angular position of the wings is determined.

To the inner lower portion of the surface of each wing is attached a pulverizer 24, adjustably held in position by set screws 25, which pass through slots 26. Each pulverizer comprises a thin sheet of metal having a vertical portion 27, and a downwardly bent inclined portion 28, the edge of which is spaced from the lower edge of the wing.

In operation my improved implement is designed to be adjusted to work between rows of corn, cotton or other plants, the wings being adjusted to obtain the proper angular relation to suit the width between the plants. The plow point is adjusted, but it may be stated that the plow is not intended to dig very deep into the ground, but of course it must depend below the bottom of the forward curved portion 5, in the beam, and the bottom of the wings.

The parts having been adjusted, the plow is drawn between the plants, the curved portion 5, riding over the surface of the ground.

The plow point forms a furrow, and the thrown up earth is immediately engaged by the wings and is spread out, and left in rows adjacent the plants. The pulverizers which depend slightly below the bottom of the wings engage rough earth, and cut same into small pieces, and in fact they act to cut up the earth with which they come into contact.

By providing the beam of the shape shown and described, the plow is maintained steadily in its operation, and the wings are retained in close contact with the surface of the earth.

The construction is simple, and by reason of the various adjustments of the parts, the implement is effective as a means for cultivating the soil between the plants.

What I claim is:—

1. In an implement of the class described, the combination of a substantially S shape beam, the forward curved end of which is adapted to ride on the surface of the earth, a plow point at the rear end of the beam, and wings extending rearwardly and outwardly from the rear end of the beam.

2. In an implement of the class described, the combination of a substantially S shape beam, the forward curved portion of which is adapted to ride on the surface of the earth, a pivoted plow point at the rear end of the beam, a rod extending from the plow point upwardly and through the beam, means for adjusting the rod, a brace extending from the forward end of the beam to the rear of the latter, and wings extending rearwardly and outwardly from the rear end of the beam.

3. In an implement of the class described, the combination of a substantially S shaped beam, the forward end of which is adapted to ride on the surface of the ground, a plow point at the rear end of the beam, an extension projecting downwardly and rearwardly from the plow beam, wings hinged to the rear of the plow beam, bars extending inwardly from the wings, and adjusting means on the extension engaging the bars to hold the wings in adjusted position.

4. In an implement of the class described, the combination of a substantially S shape plow beam, the forward curved portion of which is adapted to ride on the surface of the earth, a pivoted plow point at the rear end of the beam extending below the horizontal plane of the bottom of the curved portion, means for adjusting the plow point, wings extending rearwardly and outwardly from the rear of the beam, an extension projecting rearwardly from the beam, and braces connecting the extension and the wings.

5. In an implement of the class described, the combination of a substantially S shaped plow beam, the forward curved portion of which is adapted to ride on the surface of the earth, a pivoted plow point at the rear end of the beam extending below the horizontal plane of the bottom of the curved portion, means for adjusting the plow point, wings extending rearwardly and outwardly from the rear of the beam, an extension projecting rearwardly from the beam, braces connecting the extension and the wings, and pulverizers attached to the inner lower portions of the wings, said pulverizers extending below the bottoms of the wings.

In testimony whereof I affix my signature in the presence of two witnesses.

MAX H. BRABANDT.

Witnesses:
H. H. DAVIS,
E. H. DOOLIN.